United States Patent [19]

Mutou et al.

[11] Patent Number: 4,760,862

[45] Date of Patent: Aug. 2, 1988

[54] AIR PRESSURE REGULATOR

[75] Inventors: Yoshiichi Mutou, Kakamigahara; Eiji Uematsu, Nagoya, both of Japan

[73] Assignee: CKD Kabushiki kaisha, Aichi, Japan

[21] Appl. No.: 14,297

[22] Filed: Feb. 13, 1987

[30] Foreign Application Priority Data

Feb. 17, 1986 [JP] Japan ................... 61-21261
Feb. 17, 1986 [JP] Japan ................... 61-21262

[51] Int. Cl.$^4$ ................... G05D 16/06; F16K 31/60
[52] U.S. Cl. ................... 137/315; 137/505.42; 251/291
[58] Field of Search ................... 137/505.42, 315, 316; 251/291

[56] References Cited

U.S. PATENT DOCUMENTS

| | | | |
|---|---|---|---|
| 2,447,067 | 8/1948 | Hamilton | 137/505.42 |
| 2,693,934 | 11/1954 | Meldgaard | 251/291 |
| 3,503,586 | 3/1970 | Bordes | 251/291 X |
| 3,621,867 | 11/1971 | Johnson | 137/505.42 X |
| 3,926,208 | 12/1945 | Hoffman | 137/505.42 X |
| 4,094,337 | 6/1978 | Robinson | 137/505.42 |
| 4,282,766 | 8/1981 | Huber | 137/505.42 X |
| 4,679,582 | 7/1987 | Zwicker | 137/505.42 |
| 4,696,320 | 9/1987 | Bull | 137/505.42 |

Primary Examiner—Martin P. Schwadron
Assistant Examiner—Stephen M. Hepperle
Attorney, Agent, or Firm—Emmanuel J. Lobato; Robert E. Burns

[57] ABSTRACT

An air pressure regulator and an adjusting mechanism for a regulating device such as an air pressure regulator having a value body having a valve element and a diaphragm therein and a spring bonnet. The spring bonnet has a peripheral recess or circumferential groove and a external male thread. The adjusting mechanism has an outer sleeve knob removably mounted on the spring bonnet for rotating a threaded pressure-adjusting spindle or adjustment screw internally of the spring bonnet. The knob has axial internal elastic claws. Each claw has a projection elastically received in the groove of the spring bonnet when mounted in assembly therewith. The claws elastically bias the corresponding projections into the groove and hold the tubular know in axial assembly with the regulator. Rotation of the knob rotates the adjustment screw for adjusting spring pressure of a spring acting on the diaphragm for regulating air pressure to maintain it constant. An internally threaded outer sleeve is screwed on to the external male thread on the spring bonnet before the knob is mounted in assembly with the spring bonnet. To remove the knob the outer sleeve is unscrewed and a surface thereon bears on a surface of the knob and urges it axially so that the elastic claws elastically uncouple their projections from the spring bonnet.

13 Claims, 2 Drawing Sheets

AIR PRESSURE REGULATOR

BACKGROUND OF THE INVENTION

In general, the air pressure regulator is so constructed that a cylindrical support is secured to one outer surface of a body with interposition of a diaphragm, a retaining member being slidable within the cylindrical support is threaded on an adjustment screw rotatably mounted in said cylindrical support, there is provided between said retaining member and said diaphragm an adjustment spring, a resilient force of said adjustment spring is balanced with a pressure prevailing within a pressure chamber communicating with a secondary chamber and thereby an opening degree of a valve port defined between a primary chamber and said secondary chamber is varied to maintain a secondary pressure substantially at a constant level, and an adjustment knob connected to the adjustment screw for rotation integrally therewith is rotated to adjust a resilient force of the adjustment spring and thereby to adjust a set value of the secondary pressure.

Conventionally, the adjustment knob for such air pressure regulator of prior art has been adapted to be secured by means of set screws or the like to the adjustment screw and has made installation or dismounting for cleaning an inconveniently time-consuming task. To overcome such inconvenience, an improved arrangement has been proposed such that the adjustment knob is constructed in the form of a cylindrical component adapted to be rotated by means of a hexagonal coupling or the like integrally with the adjustment screw, said adjustment knob is provided with elastic lock claws depending from its upper wall substantially in parallel with its inner peripheral surface, on one hand, the cylindrical support is provided in its outer peripheral surface with a circumferential groove, on the other hand, so that said elastic lock claws are engaged into said circumferential groove by depressing the adjustment knob onto the cylindrical support and thereby said adjustment knob is rotatably mounted on said cylindrical support, and said adjustment knob is dismounted from said cylindrical support as said elastic lock claws are disengaged from said circumferential groove by pulling said adjustment knob. This improved construction is certainly advantageous in that the adjustment knob can be easily mounted on the cylindrical support merely depressing said adjustment knob onto said cylindrical support. However, when it is desired to dismount the adjustment knob from the cylindrical support, a relatively large force would be required to release the elastic lock claws from the circumferential groove and the operation of dismounting would be correspondingly troublesome. If an extent by which the elastic lock claws are engaged into the circumferential groove is adjusted to be relatively shallow in order to facilitate the operation of dismounting, there would occur an inconvenience such that the adjustment knob might be readily detached from the cylindrical support during rotation of said adjustment knob in its use.

OBJECT OF THE INVENTION

The object of the present invention is to provide an air pressure regulator so improvded that said adjustment knob can be easily mounted or dismounted on or from the cylindrical support.

SUMMARY OF THE INVENTION

The object of the present invention as set forth above is achieved by the air pressure regulator having the previously mentioned general configuration characterized in that the adjustment knob is cylindrical and includes elastic lock claws depending from its top wall substantially in parallel to its inner peripheral surface so that said elastic lock claws may be engaged into a circumferential groove formed in the outer peripheral surface of said cylindrical support to rotatably mount said adjustment knob around the upwardly projecting end of said cylindrical support, and said cylindrical support is provided in the outer peripheral surface of a portion thereof adjacent the end secured to a body of said cylindrical support with a male thread in cooperation with which there is provided a female-threaded member so that, in the course of threading said female-threaded member along said male thread, said female-threaded member bears against an end surface of said adjustment knob and a force thus exerted by the female-threaded member upon the adjustment knob may be utilized to disengage the elastic lock claws from the circumferential groove for dismounting of the adjustment knob. In this manner, the adjustment knob can be easily dismounted from the cylindrical support without requiring a large force even when the elastic lock claws have been engaged into the circumferential groove to a relatively deep extent. Furthermore, in the case that the cylindrical support is secured to the mounting plate by inserting it into the mounting hole formed in said mounting plate, the female-threaded member may be threaded towards the body to clamp the mounting plate between said female-threaded member and said body. The female-threaded member can serve also as fastener means.

DESCRIPTION OF THE PREFERRED EMBODIMENT

Figure 1:
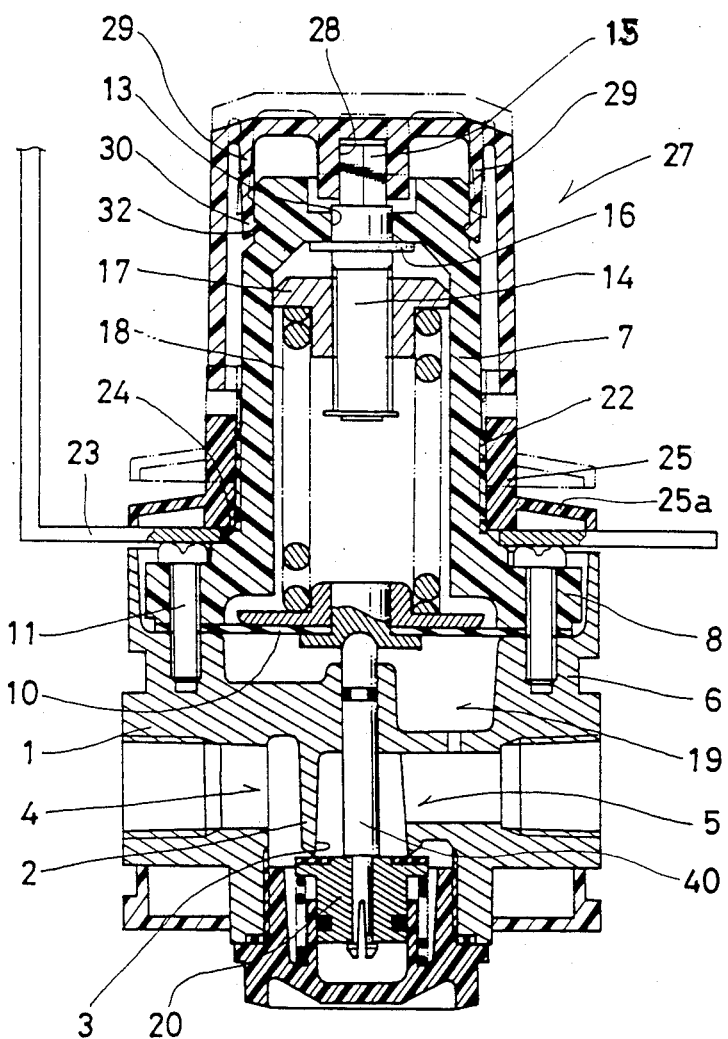
FIG. 1 illustrates, in an axial section, an embodiment of the air pressure regulator constructed in accordance with the present invention.

An embodiment of the present invention will be described in reference with FIG. 1.

A body 1 is divided by a partition 2 having a valve port 3 into a primary chamber 4 and a secondary chamber 5 and has an annular projection 6 formed on its top. A cylindrical support 7 closed at upper side and provided around its lower end with a flange 8 is secured by bolts 11 to an upper surface of said annular projection 6 with interposition of a diaphragm 10. An adjustment screw 14 having a hexagonal shaft 15 extending from its upper end is inserted into an insertion bore 13 formed through the upper wall of the cylindrical support 7 with a flange 16 extending outwardly from an intermediate portion of said adjustment screw 14 bearing against a circumferential edge of the insertion bore 13 and thereby the adjustment screw 14 is rotatably supported. A retaining member 17 unrotatably received within the cylindrical support 7 is threaded around said adjustment screw 14 and there is provided an adjustment spring 18 between said retaining member 17 and the diaphragm 10. A resilient force of this adjustment spring 18 is balanced with a pressure within a pressure chamber 19 communicating with the secondary chamber 5, causing a valve block 20 connected by a connector rod 40 to the diaphragm 10 to be vertically moved so as to vary a degree of opening of the valve port 3. Thereby a flow rate of air stream flowing from the primary chamber 4 into the secondary chamber 5 is so controlled to maintain a secondary pressure at a substantially constant level. A set value of this secondary pressure is adjusted by adjusting the resiliency of said adjustment spring 18 through rotation of an adjustment knob 27 adapted to be rotatably integrally with the adjustment screw 14. Details of said adjustment knob 27 will be described later.

The cylindrical support 7 is provided therearound at a level just above said flange 8 with a male thread 22. After the cylindrical support 7 has been inserted into a mounting hole 24 formed in a mounting plate 25 from the underside, a female-threaded member 25 having therearound a flange 25a is engaged with said male thread 22 and tightened until the mounting plate 23 is clamped between the female-threaded member 25 and the flange 8 of the cylindrical support 7 and thereby the air pressure regulator is effectively secured to the mounting plate 23. The cylindrical support 7 carries at the upper end said adjustment knob 27 which is made of synthetic resin in the form of a cylinder closed at it upper side. The adjustment knob 27 further includes a hexagonal recess 28 formed in its upper wall to receive said hexagonal shaft 15 of the adjustment screw 14 and a plurality of elastic lock claws 29 depending from the upper wall at points approximately spaced one from another along the inner periphery of said adjustment knob 27. Each of said elastic lock claws 29 has a hook-like portion 30 at its free end. Correspondingly, the cylindrical support 7 is provided in the outer periphery near the top end with a circumferential groove 32 into which said hook-like portions 30 of the respective elastic lock claws 29 are engaged. This adjustment knob 27 is received on the upper end of the cylindrical support 7 with the hexagonal recess 28 receiving the hexagonal shaft 15 of the adjustment screw 14 and the elastic lock claws 29 being forced downwards under an elastic deformation until the hook-like portions 30 of the respective elastic lock claws 29 are engaged into the circumferential groove 32 by their restoring elasticities. Thus the adjustment knob 27 is rotatably mounted on the cylindrical support 7 and in this state the lower end of the adjustment knob 27 lies slightly above the upper end of the female-threaded member 25 and is aligned therewith.

With this embodiment having the arrangement as has been described above, the female-threaded member 25 bears against the lower end of the adjustment knob 27 in the course of threading along the male thread 22 and thereby progressively urges the adjustment knob 27 upwards during reverse rotation of the female-threaded member 25 in order to remove the air pressure regulator from the mounting plate 23, so that, as indicated by chain lines in FIG. 1, the force urging the adjustment knob 27 upwards permits the hook-like portions 30 of the respective elastic lock claws 29 to be released from the circumferential groove 32 against the elasticities of these lock claws 29 and thereby permits the adjustment knob 27 to be removed from the cylindrical support 7. The feature that the force exerted by the female-threaded member 25 upon the adjustment knob 27 is utilized to remove the latter from the cylindrical support 7 is advantageous in that, even when the elastic lock claws 29 have been engaged into the circumferential groove 32 to a relatively deep extent lest the adjustment knob 27 should be easily removed during rotation thereof, these elastic lock claws 29 can be smoothly disengaged from the circumferential groove 32 and the removal of the adjustment knob 27 is accomplished simultaneously with operation of disassembling the air pressure regulator from the mounting plate 23. The feature thus permits the disassembling operation to be efficiently achieved.

It should be understood that the air pressure regulator may be directly connected at the body 1 thereof to a connector pipe instead of being secured to the mounting plate 23 as in the above-mentioned embodiment. Even in such case, the adjustment knob 27 can be easily removed by reversely rotating the female-threaded member 25 which has been threaded on the cylindrical support 7. The construction of the embodiment as has been described hereinabove is advantageous also from an aesthetic viewpoint since the bolts 11 used to secure the cylindrical support 7 to the body 1 are covered by the flange 25a of the female-threaded member 25.

Figure 2:
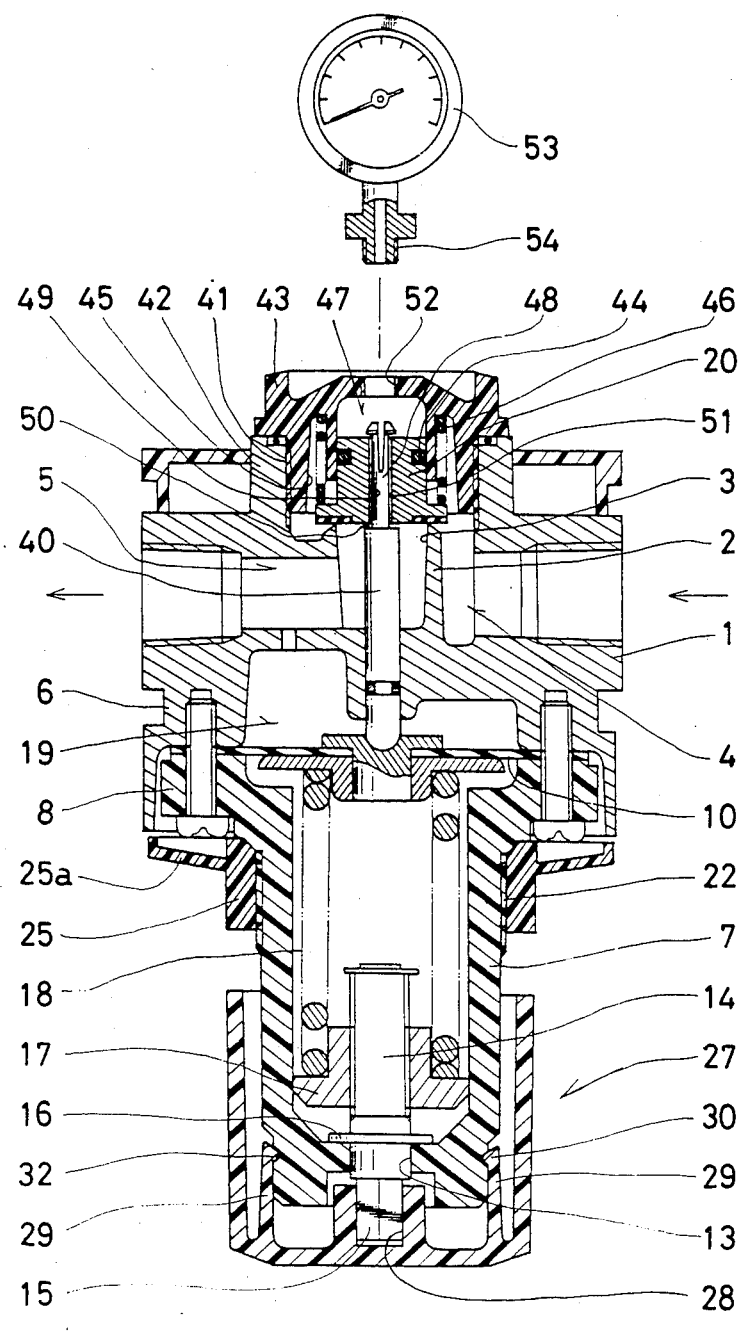
FIG. 2 illustrates, also in an axial section, a variant of the embodiment of FIG. 1 adapted to be incorporated with a pressure gauge.

FIG. 2 illustrates a variant of the above-mentioned embodiment, in which the overall construction has the upside-down orientation with respect to the embodiment of FIG. 1 and a pressure gauge mounted thereto. The body 1 is formed on its top surface with a cylindrical boss 42 having an interior female thread 41 and a cap 43 of synthetic resin in the form of a cylinder downwardly opened is threaded into said boss 42 so that the inner peripheral surface of said cap 43 is fit against the valve block 20 with interposition of an O-ring 44 received in a groove formed in the outer peripheral surface of said valve block 20 in tight but relatively slidable fashion. A coil spring 46 lodged in an annular recess 45 formed in lower surface of the cap 43 biases the valve block 20 in a valve closing direction. There is provided a pressure space 47 between the upper surface of the valve block 20 and the cap 43. A diameter-reduced portion 48 of the connector rod 40 connecting the diaphragm 10 to the valve block 20 has an outer diameter smaller than an inner diameter of a central bore 49 extending through the valve block 20 and a stepped portion 50 of the connector rod 40 adapted to bear against the valve block 20 is provided with a groove (not shown), thus establishing between the outer peripheral surface of the connector rod 40 at the diameter-reduced portion 48 thereof and the inner peripheral surface of the central bore 49 a passage 51 through which the pressure space 47 communicates with the secondary chamber 5. The upper wall of the cap 43 is provided therethrough with a threaded hole 52 through which the pressure space 47 communicates with the exterior and a connecting cylinder 54 of the pressure gauge 53 is threaded into said threaded hole 52 for incorporation of the pressure gauge 53. The valve block 20 is tightly fit against the inner peripheral surface of the cap 43 and, therefore, the pressure space 47 is isolated from the primary chamber 4. During a vertical movement of the valve block 20, a quantity of air flows between the secondary chamber 5 and the pressure space 47 through the passage 51 defined between the central bore 49 of the valve block 20 and the connector rod 40 so as to maintain a pressure within the pressure space 47 at the same level of a pressure within the secondary chamber 5. This pressure is introduced through the connecting cylinder 54 threaded into the threaded hole 52 to the pressure gauge 53 for measurement of the secondary pressure.

We claim:

1. An air pressure regulator including
   a body having a valve port defined between a primary chamber communicating with an inlet and a secondary chamber communicating with an outlet and a pressure chamber formed in one outer side in communication with said secondary chamber;
   a diaphragm extending across said one outer side so as to close said pressure chamber of said body;
   a valve block being movable in operative associated with said diaphragm to open and close said valve port;
   a cylindrical support secured to said one outer side of said body;
   an adjustment spring disposed within said cylindrical support and adapted to exert an elastic force on the outer surface of said diaphragm; and
   an adjustment screw extending through an end surface of said cylindrical support and rotatably supported thereby, said adjustment screw being provided along a portion thereof inserted into said cylindrical support with a male thread on which a retaining member is threaded to compress said adjustment spring and having a portion extending exterior of said cylindrical support, to which an adjustment knob is connected;
   wherein a compression of said adjustment spring is adjusted by rotating said adjustment screw with said adjustment knob gripped in hand so as to move said retaining member along said male thread and wherein said diaphragm is so deformed that a balance is established between a compressive force of said adjustment spring and a pressure prevailing within said secondary chamber acting upon said pressure chamber and thereby said valve block opens and closes said valve port so as to maintain said pressure prevailing within said secondary chamber at a constant value, characterized in that said adjustment knob is cylindrical and includes elastic lock claws depending from its top wall substantially in parallel to its inner peripheral surface so that said elastic lock claws may be engaged into a circumferential groove formed in the outer peripheral surface of said cylindrical support by pressing said adjustment knob onto said cylindrical support to rotatably mount said adjustment knob around the upwardly projecting end of said cylindrical support, and said cylindrical support is provided in the outer peripheral surface of a portion thereof adjacent the end secured to said body with a male thread in cooperation with which there is provided a female-threaded member so that, in the course of unscrewing said female-threaded member along said male thread, said female-threaded member bears against and urges an end surface of said adjustment knob and said elastic lock claws deforming elastically and disengaging from said circumferential groove so that the female-threaded member is removed from said cylindrical support.

2. An air pressure regulator according to claim 1, wherein said female-threaded member serves also as a nut to secure the air pressure regulator to a mounting plate.

3. An adjusting mechanism for a regulating device having a tubular housing with an internal thread and an external peripheral recess, and an internal adjustment spindle extending axially in said housing rotatably mounted for effecting adjustment of a physical variable being regulated by said regulating device, said adjusting mechanism comprising, an outer sleeve having an internal thread for screwing the sleeve on said housing external thread for assembling the sleeve on the tubular housing, a tubular knob removably mounted on the tubular housing circumferentially thereof for rotation thereon for rotating the adjustment spindle, the knob having means for releasably coupling the knob to the adjustment spindle for rotating the adjustment sprindle for effecting said adjustment of a physical variable being regulated, said knob having internal elastic claws extending axially in said knob and each having a projection elastically received in said peripheral recess when the knob is mounted axially on the tubular housing circumferentially thereof in assembly therewith, the claws elastically biasing the corresponding projection thereof into said recess and holding the outer sleeve in axial assembly with said tubular housing, the outer sleeve being removable from said tubular housing by unscrewing, and said outer sleeve being disposed relative to said knob for engaging the knob and displacing it axially as the outer sleeve is unscrewed to thereby disengage the knob claws from the tubular housing for removing the knob from the tubular housing.

4. An adjusting mechanism according to claim 3, in which said recess is a circumferential groove on the tubular housing.

5. An adjusting mechanism according to claim 3, in which said tubular knob claws are made of an elastic plastic.

6. An adjusting mechanism according to claim 3, in which said claws are disposed circumferentially of said tubular housing when said knob is mounted on said tubular housing.

7. An air pressure regular having a valve body having a tubular body portion with an internal thread and an external peripheral groove, an internal adjustment spindle extending axially in said tubular body portion rotatably mounted for effecting adjustment of an air pressure being regulated by said pressure regulator, said adjusting mechanism comprising, an outer sleeve having an internal thread for screwing the sleeve on said tubular body portion external thread for assemblying the sleeve on the tubular body portion, a tubular knob removably mounted on the tubular body portion circumferentially thereof for rotation thereon for rotating the adjustment spindle, the knob having means for releasably coupling the knob to the adjustment spindle for rotating the adjustment spindle for effecting said adjustment of said air pressure being regulated, said knob having internal elastic claws extending axially in said knowbw and each having a projection elastically received in said peripheral groove when the knob is mounted axially on the tubular body portion circumferentially thereof in assembly therewith, the claws elastically biasing the corresponding projection thereof into said groove and holding the outer sleeve in axial assembly with said tubular body portion, the outer sleeve being removable from said tubular body portion by unscrewing, and said outer sleeve being disposed relative to said knob for engaging the knob and displacing it axially as the outer sleeve is unscrewed to thereby disengage the knob claws from the tubular body portion for removing the knob from the tubular body portion.

8. An air pressure regulator according to claim 7, in which said valve body has a port, and a valve element connected to said spindle for variably opening and closing said port.

9. An air pressure regulator according to claim 8, in which said spindle is threaded externally for movement axially internally of said tubular body portion under control of said tubular knob when rotated relative to said tubular body portion, and threaded means in said tubular body portion coactive with said spindle for axial movement relative thereto.

10. An air pressure regulator according to claim 9, including a pressure control diaphragm adjustably set for pressure control in response to axial adjustment of said spindle.

11. An air pressure regulator according to claim 7, in which tubular knob is made of plastic, and said claws thereof are disposed circumferentially of said tubular body portion when the tubular is assembled with said tubular body portion.

12. An air pressure regulator according to claim 7, in which said tubular body portion is a spring bonnet having a spring therein, a flexible diaphragm in said valve body for air pressure control by adjustment of spring pressure of said spring acting on said diaphragm, and said spindle being adjustable axially for variably controlling said spring pressure on said diaphragm.

13. An air pressure regulator according to claim 12, including means coactive with said diaphragm for regulating and maintaining a constant predetermined air pressure under control of said adjustment spindle.

* * * * *